(12) United States Patent
Chung et al.

(10) Patent No.: US 11,423,238 B2
(45) Date of Patent: Aug. 23, 2022

(54) SENTENCE EMBEDDING METHOD AND APPARATUS BASED ON SUBWORD EMBEDDING AND SKIP-THOUGHTS

(71) Applicant: ELECTRONICS AND TELECOMMUNICATIONS RESEARCH INSTITUTE, Daejeon (KR)

(72) Inventors: Eui Sok Chung, Daejeon (KR); Hyun Woo Kim, Daejeon (KR); Hwa Jeon Song, Daejeon (KR); Ho Young Jung, Daejeon (KR); Byung Ok Kang, Daejeon (KR); Jeon Gue Park, Daejeon (KR); Yoo Rhee Oh, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 322 days.

(21) Appl. No.: 16/671,773

(22) Filed: Nov. 1, 2019

(65) Prior Publication Data
US 2020/0175119 A1 Jun. 4, 2020

(30) Foreign Application Priority Data
Dec. 4, 2018 (KR) .......... 10-2018-0154641

(51) Int. Cl.
*G06F 40/56* (2020.01)
*G06F 40/30* (2020.01)
*G06F 40/289* (2020.01)

(52) U.S. Cl.
CPC ............ *G06F 40/56* (2020.01); *G06F 40/289* (2020.01); *G06F 40/30* (2020.01)

(58) Field of Classification Search
CPC ......... G06F 40/56; G06F 40/289; G06F 40/30
See application file for complete search history.

(56) References Cited

U.S. PATENT DOCUMENTS 10,402,494 B2 9/2019 Chung et al.
2013/0226559 A1 8/2013 Lim et al.
(Continued)

FOREIGN PATENT DOCUMENTS

KR 1020180108257 A 10/2018

OTHER PUBLICATIONS

Jawahar, Ganesh & Gupta, Manish & Varma, Vasudeva. (2016). Doc2Sent2Vec: A Novel Two-Phase Approach for Learning Document Representation. 809-812. 10.1145/2911451.2914717. (Year: 2016).*

(Continued)

*Primary Examiner* — Paras D Shah

(57) ABSTRACT

Provided are sentence embedding method and apparatus based on subword embedding and skip-thoughts. To integrate skip-thought sentence embedding learning methodology with a subword embedding technique, a skip-thought sentence embedding learning method based on subword embedding and methodology for simultaneously learning subword embedding learning and skip-thought sentence embedding learning, that is, multitask learning methodology, are provided as methodology for applying intra-sentence contextual information to subword embedding in the case of subword embedding learning. This makes it possible to apply a sentence embedding approach to agglutinative languages such as Korean in a bag-of-words form. Also, skip-thought sentence embedding learning methodology is integrated with a subword embedding technique such that intra-sentence contextual information can be used in the case of subword embedding learning. A proposed model minimizes additional training parameters based on sentence (Continued)

embedding such that most training results may be accumulated in a subword embedding parameter.

10 Claims, 3 Drawing Sheets

(56) References Cited

U.S. PATENT DOCUMENTS

| | | | |
|---|---|---|---|
| 2018/0121419 A1* | 5/2018 | Lee | G06F 40/56 |
| 2018/0121799 A1* | 5/2018 | Hashimoto | G06N 3/0472 |
| 2018/0144234 A1 | 5/2018 | Devesa | |
| 2018/0157640 A1 | 6/2018 | Chung et al. | |
| 2019/0205733 A1* | 7/2019 | Ghaeini | G06N 3/0454 |
| 2020/0050667 A1* | 2/2020 | Lin | G06F 40/279 |

OTHER PUBLICATIONS

Piotr Bojanowski, Edouard Grave, Armand Joulin, Tomas Mikolov; Enriching Word Vectors with Subword Information. Transactions of the Association for Computational Linguistics 2017; 5 135-146. doi: https://doi.org/10.1162/tacl_a_00051 (Year: 2017).*

Dias, Rafael Felipe Sandroni, and Ivandré Paraboni. "Author Profiling using Word Embeddings with Subword Information." (Year: 2018).*

Ding, Yixin, and Liutong Xu. "Learning Sentence Embeddings Based on Weighted Contexts from Unlabelled Data." 2018 IEEE 9th International Conference on Software Engineering and Service Science (ICSESS). IEEE, 2018. (Year: 2018).*

Mikolov et al., "Distributed representations of words and phrases and their compositionality," Advances in neural information processing systems, Oct. 16, 2013, pp. 3111-3119, arXiv.

Bojanowski et al., "Enriching word vectors with subword information," Transactions of the Association for Computational Linguistics, Jun. 19, 2017, pp. 135-146, vol. 5, arXiv.

Park et al., "Subword-level Word Vector Representations for Korean," Proceedings of the 56th Annual Meeting of the Association for Computational Linguistics, Jul. 15-20, 2018, pp. 2429-2438.

Kiros et al., "Skip-thought vectors," Advances in neural information processing systems, Jun. 22, 2015, pp. 1-11, arXiv.

Kenter et al., "Siamese CBOW: Optimizing Word Embeddings for Sentence Representations," Proceedings of the 54th Annual Meeting of the Association for Computational Linguistics (ACL), Aug. 7-12, 2016, pp. 941-951.

Sukhbaatar, et al., "End-to-end memory networks," In Advances in neural information processing systems, Nov. 24, 2015, pp. 1-11, arXiv.

Collobert et al., "Natural Language Processing (Almost) from Scratch," Journal of Machine Learning Research 12, Jan. 10, 2011, pp. 2493-2537.

* cited by examiner

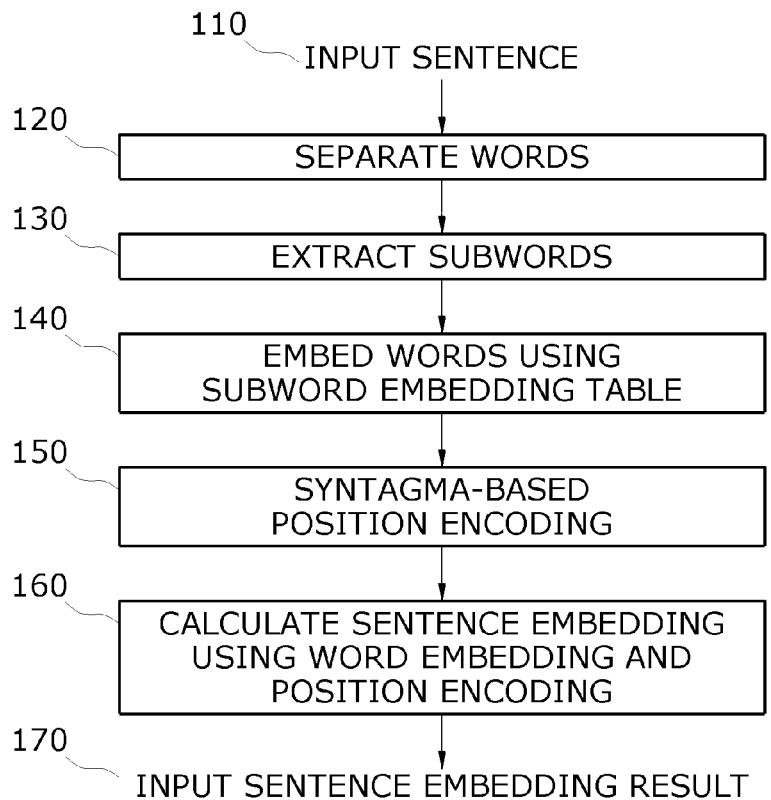

FIG. 3

| WORD | SUBWORD VECTOR SET | SUM OF SUBWORD VECTORS ($W_i$) | SYNTAGMA-BASED POSITION ENCODING ($P_i$=PosEnc(j)) |
|---|---|---|---|
| there | {"<th", "<the", "the", "ther", "her", "here", "ere", "ere>", "re>"} | $W_0$ | $P_0$=PosEnc(0) |
| was | {"<wa", "<was", "was", "was>", "as>"} | $W_1$ | $P_1$=PosEnc(1) |
| a | {"<a>"} | $W_2$ | $P_2$=PosEnc(2) |
| small | {"<sm", "<sma", "sma", "mall", "all", "all>", "ll>"} | $W_3$ | $P_3$=PosEnc(3) |
| table | {"<ta", "<tab", "tab", "tabl", "abl", "able", "ble", "ble>", "le>"} | $W_4$ | $P_4$=PosEnc(4) |
| bolted | {"<bo", "<bol", "bol", "bolt", "olt", "olte", "lte", "lted", "ted", "ted>", "ed>"} | $W_5$ | $P_5$=PosEnc(0) |
| to | {"<to", "<to>", "to>"} | $W_6$ | $P_6$=PosEnc(1) |
| the | {"<th", "<the", "the", "the>", "he>"} | $W_7$ | $P_7$=PosEnc(2) |
| floor | {"<fl", "<flo", "flo", "floo", "loo", "floor", "loor", "oor>", "or>"} | $W_8$ | $P_8$=PosEnc(3) |
| SENTENCE EMBEDDING | | $\sum_j (P_j \times W_j) / NUM\_OF\_WORDS$ | |

SENTENCE EMBEDDING METHOD AND APPARATUS BASED ON SUBWORD EMBEDDING AND SKIP-THOUGHTS

CROSS-REFERENCE TO RELATED APPLICATION

This application claims priority to and the benefit of Korean Patent Application No. 2018-0154641, filed on Dec. 4, 2018, the disclosure of which is incorporated herein by reference in its entirety.

BACKGROUND

1. Field of the Invention

The present invention relates to a sentence embedding technology. More particularly, this invention relates to a technology for using embedding value weights of words which constitute syntagmas to determine a sentence embedding value by using subword embedding, a skip-thought model, and syntagma-based position encoding.

2. Discussion of Related Art

Word embedding refers to a technique for allocating word-specific vector values to a given word list and enabling artificial intelligence to learn similar words so that the similar words may be within a short distance in a vector space. A representative approach is the skip-gram architecture, in which it is possible to learn word embedding by using general massive text as training data and creating a bilinear model from a given word vector list and context word vector list. A related word embedding technique employing the skip-gram architecture has a problem in that word embedding results are output only from a given word list. As a solution to this problem, there is subword embedding, in which a given word is represented as a set of specific sub-features, and embedding calculation and learning is performed on the sub-features.

According to a subword embedding technique, in the case of English, a subword may be composed of alphabet letters. On the other hand, in the case of Korean, there are subword feature research results based on syllables and phonemes and subword feature research results based on syllables and graphemes. The former research results do not show a significant difference between experimental results of syllables and phonemes. The latter research results do not show significant difference between subword features of syllables and phonemes but show a slight performance improvement when the two kinds of features are used in combination.

There are some other technologies related to the present invention. A skip-thought model is an approach for learning two long short-term memory (LSTM) parameters, which are connected in an encoder-decoder form for the preceding sentence and the subsequent sentence of a target sentence, using three consecutive sentences and utilizing encoder-based sentence embedding. As a word embedding learning approach in which sentence embedding is taken into consideration, there is the Siamese Continuous Bag of Words (CBOW) model for performing sentence embedding with averages of word embedding values constituting each of surrounding sentences and a target sentence and then applying a cosine similarity of corresponding sentence embedding pairs to word embedding learning. Position encoding is a method for reflecting word order in the case of representing sentence embedding as the sum of simply structured word embedding in a bag-of-words form.

SUMMARY OF THE INVENTION

The present invention is directed to providing a sentence embedding method based on subword embedding and a skip-thought model in order to apply subword embedding, which has been suggested as a solution to the problem of a related word embedding technique employing the skip-gram architecture as described above, to agglutinative languages such as Korean.

Meanwhile, a sentence embedding value may be used by calculating an average of word embedding values constituting a sentence. A problem lies in that subword embedding values for sentence embedding are learned with contextual words of one sentence and adjacent sentences. In other words, when one sentence in text is a target sentence, sentences which are one or two sentences away from the sentence also correspond to contextual sentences but are not used in learning.

Therefore, the present invention is also directed to providing a subword embedding technique for enhancing a sentence embedding capability of subword embedding by applying not only word context but also sentence context to subword embedding learning.

To achieve the first object, the present invention provides a method of using embedding value weights of words constituting syntagmas to determine a sentence embedding value by applying syntagma-based position encoding to a sentence embedding method employing subword embedding. To integrate skip-thought sentence embedding learning methodology with a subword embedding technique, the present invention provides a skip-thought sentence embedding learning method based on subword embedding and methodology for simultaneously learning subword embedding learning and skip-thought sentence embedding learning, that is, multitask learning methodology, as methodology for applying intra-sentence contextual information to subword embedding in the case of subword embedding learning. This makes it possible to apply a sentence embedding approach to agglutinative languages such as Korean in a bag-of-words form.

To achieve the second object, the present invention integrates skip-thought sentence embedding learning methodology with a subword embedding technique and thereby makes it possible to use intra-sentence contextual information in the case of subword embedding learning. A model proposed by the present invention minimizes additional training parameters based on sentence embedding such that most training results may be accumulated in a subword embedding parameter.

According to one aspect of the present invention, there is provided a sentence embedding method based on subword embedding and skip-thoughts, the method including an operation of separating words for token separation for an input sentence, an operation of extracting subwords from the words determined in the word separation operation, an operation of deriving subword embedding vector values by embedding the extracted subwords when the subword extraction operation is finished, an operation of determining position encoding values by performing syntagma-based position encoding using fixed weights according to word positions in the sentence after the subword embedding vector value derivation operation in order for sentence embedding calculation, and an operation of performing sentence embedding calculation from the subword embedding vector values and the position encoding values.

According to another aspect of the present invention, there is provided a subword embedding and skip-thought sentence embedding integration model construction method for generating subword embedding vector values required for performing the sentence embedding method based on subword embedding and skip-thoughts. The method includes generating a subword table including a {word: subword set} dictionary and a {subword: vector value} table by separating words and extracting subwords from training text including consecutive sentence context, generating subword embedding training data of {target word, contextual word} for subword embedding learning, and generating skip-thought sentence embedding training data of {target sentence, contextual sentence} for skip-thought sentence embedding learning.

According to another aspect of the present invention, there is provided a sentence embedding apparatus for outputting sentence embedding results from an input sentence. The apparatus includes a means for separating words for token separation for an input sentence and extracting subwords from the separated words, a means for deriving subword embedding vector values by embedding the extracted subwords, a means for performing syntagma-based position encoding using fixed weights according to word positions in the sentence in order to determine position encoding values for sentence embedding calculation, and a means for performing sentence embedding calculation from the subword embedding vector values and the determined position encoding values.

According to another aspect of the present invention, there is provided a subword embedding and skip-thought sentence embedding integration model for generating subword embedding vector values required for performing a sentence embedding function of the sentence embedding apparatus based on subword embedding and skip-thoughts. The model includes a subword table including a {word: subword set} dictionary and a {subword: vector value} table generated by separating words and extracting subwords from training text including consecutive sentence context, subword embedding training data generated in a {target word, contextual word} form for subword embedding learning, and skip-thought sentence embedding training data generated in a {target sentence, contextual sentence} form for skip-thought sentence embedding learning.

The present invention having the configuration and functionality employs an existing skip-gram model at a sentence level and is based on a skip-thought model. However, the present invention differs from related arts in that a subword model is learned and training data employing the concept of a sentence chain is used.

Although the present invention is similar to an approach for performing word embedding learning using existing sentence contextual information, the present invention differs from the approach in that the present invention is based on subword embedding and employs a bilinear model. Also, the present invention proposes an approach in which subword embedding and skip-thought sentence embedding models are integrated.

In particular, the present invention employs a position encoding technique but applies the position encoding technique to weights for words constituting a sentence. Therefore, the present invention proposes a syntagma-based position encoding technique in which characteristics of agglutinative languages, such as Korean, are taken into consideration.

The above-described configuration and functionality of the present invention will become more apparent from embodiments described below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a flowchart of a sentence embedding calculation process;

FIG. 2 is a subword embedding table;

FIG. 3 is a sentence embedding calculation table based on subword embedding and syntagma-based position encoding;

DETAILED DESCRIPTION OF EXEMPLARY EMBODIMENTS

Figure 4:
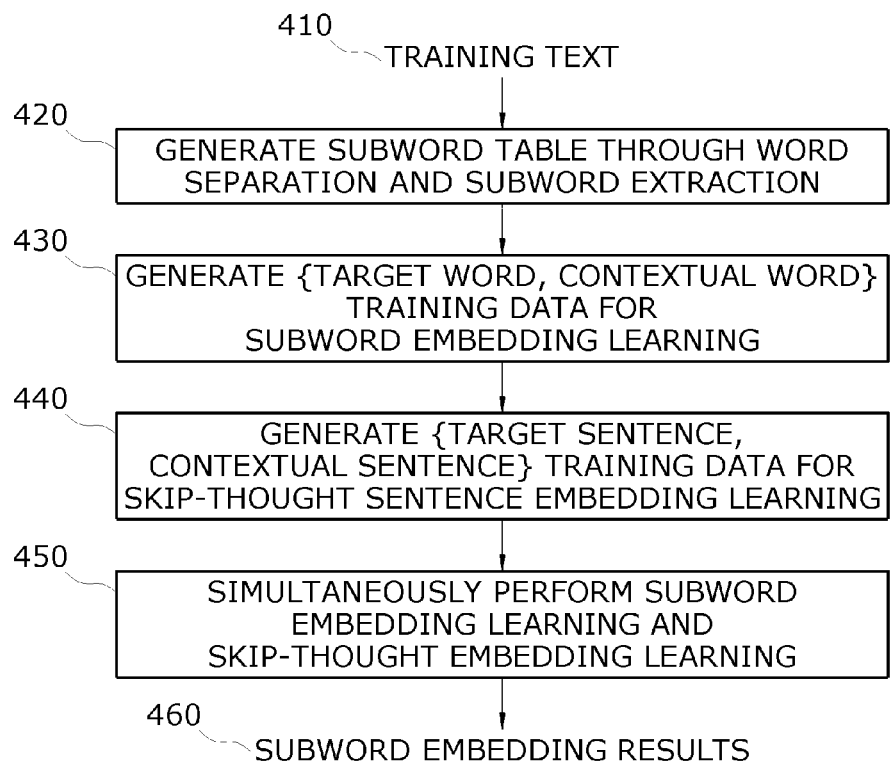
FIG. 4 is a flowchart of a subword embedding and skip-thought sentence embedding learning process.

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the art to which the present invention pertains. The present invention is defined by the claims.

Meanwhile, terms used herein are for the purpose of describing embodiments and are not intended to limit the present invention. As used herein, the singular forms are intended to include the plural forms as well unless the context clearly indicates otherwise. The terms "comprise" or "comprising" used herein indicate the presence of stated elements, steps, operations, and/or devices and do not preclude the presence or addition of one or more other elements, steps, operations, and/or devices.

Hereinafter, exemplary embodiments of the present invention will be described in detail with reference to the accompanying drawings. It should be noted that in giving reference numerals to elements of each drawing, like reference numerals refer to like elements even though the like elements are shown in different drawings. While describing the present invention, detailed descriptions of related well-known configurations or functions are omitted when they are determined to obscure the gist of the present invention.

FIG. 1 illustrates a sentence embedding calculation process in which subword embedding is used. Although the present invention will be described below as a process flow in terms of methodology, it is self-evident that the configuration and functionality of an apparatus composed of hardware or software elements for implementing this method perform substantially the same function as the method.

An input sentence 110 is converted into sentence embedding results 170 through an overall process of FIG. 1. A sentence embedding value is a multidimensional vector value which is reduced between sentences having similar meanings and increased between sentences having different meanings in a vector space. In other words, while a word embedding technique is to aggregate words having similar meanings, a sentence embedding technique is to aggregate sentences having similar meanings.

First, the input sentence 110 goes through a word separation operation 120 which is a token separation operation.

A subword extraction operation 130 is performed on words determined in the word separation operation 120. An example of subword extraction is described in the column "subword vector set" (FIG. 3 is a table showing an example of sentence embedding calculation based on subword embedding and syntagma-based position encoding). A subword set of a word "table" is, when a text feature-based length is limited to 3-4, {"<ta", "<tab", "tab", "tabl", "abl", "able", "ble", "ble>"}. Here, symbols "<" and ">" indicate the start and end of a word.

When the subword extraction operation 130 from words constituting the sentence is finished, word embedding 140 is performed using the subword embedding table of FIG. 2. A word embedding value is determined as the sum of constituent subword vectors. As subword vectors, learned subword embedding results of FIG. 2 are used. The final objective of the present invention is to derive the subword embedding vector values of FIG. 2 through a machine learning process.

After the word embedding 140 for deriving word embedding values, weights of full morphemes and bound morphemes for sentence embedding are determined differently in a syntagma-based position encoding operation 150.

In modern English, the meaning of a sentence is affected by the sequence of words constituting the sentence. English is an isolating language in linguistic typology. Therefore, when a sentence embedding technique is applied to English in a bag-of-words form in which a sentence embedding value is determined to be the sum or average of word embedding values, it is not possible to reflect a change in the sequence of constituent words. To solve this problem, a position encoding technique has been introduced. This is an approach in which fixed weights are used to determine word embedding values according to word positions in a sentence in the case of sentence embedding calculation. However, in agglutinative languages, such as Korean, word order is relatively flexible and it is difficult to apply this approach. However, general English has a syntactic structure. The simplest structure is that a sentence can be divided into short sentences that make up the sentence by using the chunk level. E.g., a sentence "there was a small table bolted to the floor" is divided into two chunks: "there was a small table" and "bolted to the floor". Here, the sentence position encoding, according to a feature of the present invention, is operated independently of the two chunks. The position encoding function is represented by PosEnc (j) as in FIG. 3, where j is position information in one chunk. PosEnc can be implemented in a variety of ways. This can be implemented to learn the relative position using sin and cos functions, and can be implemented using the sinusoidal function (see Vaswani et al.) that has recently been proposed [Vaswani, A., Shazeer, N., Parmar, N., Uszkoreit, J., Jones, L., Gomez, A. N., & Polosukhin, I. (2017). Attention is all you need. In *Advances in neural information processing systems* (pp. 5998-6008)]. An example of syntagma-based encoding is described in the column "syntagma-based position encoding" of FIG. 3.

Sentence embedding calculation 160, which is the last operation, is shown in the last row of FIG. 3. When word embedding values and position encoding values are multiplied together and an average of the products is calculated ($\Sigma_i(P_i \times W_i)$/number of words) regarding the whole sentence, the sentence embedding calculation process is finished.

FIG. 4 illustrates a subword embedding and skip-thought sentence embedding learning process. As described above, an objective of the present invention is to propose a technique for enhancing a sentence embedding capability of subword embedding by applying not only word context but also sentence context to subword embedding learning. A general learning process is as follows.

A first operation is to select training text (410). While sentences may be independent of each other in the case of word embedding, consecutive sentence context is important in the case of skip-thought sentence embedding. Therefore, the process requires training text in which sentence order is maintained without change, such as newspaper text or Internet message board text.

A second operation is to create a subword table through word separation and subword extraction (420). In this operation, it is necessary to generate a {word: subword set} dictionary and a {subword: vector value} table. At this time, a subword vector value has a random initial value.

A third operation is to generate {target word, contextual word} training data for subword embedding learning (430). In this operation, a training data generation technique for general skip-gram word embedding is used.

A fourth operation is to generate {target sentence, contextual sentence} training data for skip-thought sentence embedding learning (440). In basic concept, this operation is similar to skip-gram word embedding training data, but there is a difference in that targets are sentence context rather than word context.

Figure 5:
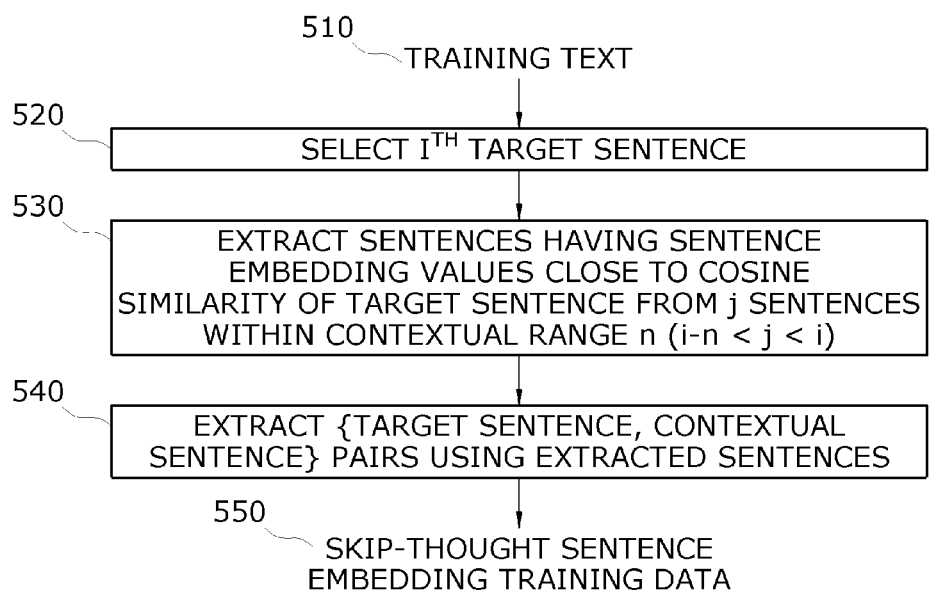
FIG. 5 is a flowchart of a process of generating a sentence chain for skip-thought sentence embedding learning.

A method proposed by the present invention to generate training data in this operation is illustrated in FIG. 5. This may be an approach for constructing skip-thought training data through sentence chain generation. An $i^{th}$ target sentence is selected (520), and sentences having sentence embedding values close to a cosine similarity of the target sentence are extracted from j sentences within a contextual range n (here, i-n<j<i) and constitute a sentence chain (530). An initial word embedding training value may be used as the sentence embedding value. {Target sentence, contextual sentence} pairs are extracted from the sentence chain (540) and constitute skip-thought sentence embedding training data (550).

Referring back to FIG. 4, a fifth operation is to simultaneously perform subword embedding learning and skip-thought embedding learning (450), which may be referred to as multitask learning. As a result, subword embedding results (460) are learned, and this model is described in detail as shown in Equations 1 to 8 below. Equations 1 to 8 describe a skip-thought sentence embedding model based on subword embedding according to an exemplary embodiment of the present invention.

Equation 1 describes a subword embedding and skip-thought sentence embedding integration model. The objective of learning is to find a subword embedding value $\Phi_t$ which maximizes a corresponding log likelihood L. Here, $T_w$ denotes the size of subword embedding training data, and $T_s$ denotes the size of skip-thought sentence embedding training data. $C_t$ denotes a set of contextual words $w_c$ of $w_t$, and $N_t$ denotes a contextual sentence set of a target sentence $sent_t$.

$$\mathcal{L} = \sum_{t=1}^{T_w} \sum_{c \in C_t} \log p(w_c \mid w_t) + \sum_{t=1}^{T_s} \sum_{n \in N_t} \log p(sent_n \mid sent_t) \quad \text{[Equation 1]}$$

Equation 2 is a bilinear model which is an exponential language model employing a target word's subword embedding set $\Phi_t$ and a context subword embedding set $\Phi_c$. A related subword model employs only constituent features $\mathcal{F}_t \subset \Phi_t$ of target words in the form of Equation 3, and contextual words employ a word embedding value $V_c$.

$$p(w_c \mid w_t) = \frac{e^{s(w_t, w_c)}}{\sum_{i=1}^{w} e^{s(w_t, i)}} \quad \text{[Equation 2]}$$

In Equation 3, $z_i$ denotes one subword constituting $w_t$.

$$s(w_t, w_c) = \sum_{i \in \mathcal{F}_t} z_i^T \cdot v_c \quad \text{[Equation 3]}$$

The present invention employs a constituent feature set $\mathcal{F}_c \subset \Phi_c$ of contextual words to replace the word embedding value $V_c$ as shown in Equation 4. This minimizes the size of a contextual word set when massive word set calculation is necessary. In other words, it is possible to increase learning speed by reducing the number of parameters to learn.

$$s(w_t, w_c) = \left(\sum_{i \in \mathcal{F}_t} z_i^t\right)^T \cdot \left(\sum_{j \in \mathcal{F}_c} z_j^c\right) \quad \text{[Equation 4]}$$

Equation 5 describes a skip-thought model in which a word target of a skip-gram word embedding model is converted into a sentence target. Equation 5 differs from related research in that a sentence embedding bilinear model based on subword embedding rather than a long short-term memory (LSTM) is selected. Therefore, unlike LSTM training parameters, all train results are stored in subword embedding $\mathcal{F}_t \subset \Phi_t$ and $\mathcal{F}_n \subset \Phi_n$ for a contextual sentence context model.

$$p(\text{sent}_n \mid \text{sent}_t) = \frac{e^{s(\text{sent}_t, \text{sent}_n)}}{\sum_{i=1}^{s} e^{s(\text{sent}_t, i)}} \quad \text{[Equation 5]}$$

Equation 6 describes a score function of a target sentence $s_t$ and a contextual sentence $s_n$ for sentence embedding. One of subword features of one word $w_t$ constituting the target sentence $s_t$ is $z_i$, and a value of $z_i$ is constantly updated in the subword embedding table $\mathcal{F}_t$ through a learning process. Likewise, the contextual sentence $s_n$ is updated in $\mathcal{F}_n$.

$$s(\text{sent}_t, \text{sent}_n) = \left(\frac{1}{|s_t|} \sum_{w_t \in s_t} \sum_{i \in \mathcal{F}_t} z_i^t\right)^T \cdot \left(\frac{1}{|s_n|} \sum_{w_n \in s_n} \sum_{j \in \mathcal{F}_n} z_j^n\right) \quad \text{[Equation 6]}$$

Equation 7 describes position encoding. $\eta$ is a word-specific constant according to a sentence construction. In other words, a value obtained by multiplying words by word-specific weights and then averaging the products is an embedding value of one sentence.

$$s(\text{sent}_t, \text{sent}_n) = \left(\frac{1}{|s_t|} \sum_{w_t \in s_t} \left[\eta_{w_t}^{s_t} \cdot \sum_{i \in \mathcal{F}_t} z_i^t\right]\right)^T \cdot \left(\frac{1}{|s_n|} \sum_{w_n \in s_n} \left[\eta_{w_n}^{s_n} \cdot \sum_{j \in \mathcal{F}_n} z_j^n\right]\right) \quad \text{[Equation 7]}$$

Finally, Equation 8 is used for learning. The denominator calculation amounts of Equations 2 and 5 are excessive. As a solution to this problem, a model is shown in which negative samples $\overline{w}_t$ and $\overline{s}_t$ are generated by negative models q and q' using noise-contrastive estimation (NCE) and the whole problem is converted into a binary classification problem thereof $\Phi_t$ learning is enabled through a process of maximizing the corresponding equation.

$$\mathcal{L}_{NCE_k}^{MC} = \sum_{(w_c, w_t) \in \mathcal{D}} \left(\log p(D=1 \mid w_c, w_t) + \sum_{i=1, \overline{w}_t \sim q}^{k} \log p(D=0 \mid w_c, \overline{w}_t)\right) + \sum_{(s_c, s_t) \in \mathcal{S}} \left(\log p(D=1 \mid s_c, s_t) + \sum_{i=1, \overline{s}_t \sim q'}^{k} \log p(D=0 \mid s_c, \overline{s}_t)\right) \quad \text{[Equation 8]}$$

The present invention makes it possible to apply sentence embedding calculation to Korean in a bag-of-words form by proposing syntagma-based position encoding which can be applied to agglutinative languages, such as Korean. Also, context-word embedding in a subword embedding technique is converted into a subword context model such that the number of parameters of a subword model may be optimized. Further, subword embedding and skip-thought sentence embedding are integrated to apply intra-sentence contextual information to subword embedding calculation, and calculation efficiency is improved by minimizing parameters for sentence embedding learning.

As described above, the present invention can be implemented in terms of apparatus or method. In particular, a function or process of each structural element of the present invention can be implemented by a hardware element including at least one of a digital signal processor (DSP), a processor, a controller, an application-specific integrated circuit (ASIC), a programmable logic element (a field programmable gate array (FPGA) or the like), and other electronic devices or a combination thereof. A function or process of each structural element can also be implemented in software in combination with or separately from a hardware element, and the software can be stored in a recording medium.

The present invention has been described in detail above with reference to exemplary embodiments. Those of ordinary skill in the technical field to which the present invention pertains should understand that various modifications and alterations can be made without departing from the technical spirit or essential features of the present invention. Therefore, it should be understood that the disclosed embodiments are not limiting but illustrative. The scope of the present invention is defined not by the specification but by the following claims, and it should be understood that all changes or modifications derived from the scope and equivalents of the claims fall within the technical scope of the present invention.

What is claimed is:

1. A sentence embedding method for outputting a sentence embedding result from an input sentence on the basis of subword embedding and skip-thoughts, the method comprising:
   separating words of the input sentence for token separation;
   extracting subwords from the words determined in the separating of words;
   deriving subword embedding vector values by embedding the extracted subwords when the extracting of subwords is finished;
   determining position encoding values by performing syntagma-based position encoding using fixed weights according to word positions in the input sentence after the deriving of subword embedding vector values in order for sentence embedding calculation; and
   performing the sentence embedding calculation based on the subword embedding vector values and the position encoding values,
   wherein the deriving subword embedding vector values comprises:
      generating a subword table including a {word: subword set} dictionary and a {subword: vector value} table by separating the words and extracting the subwords from training text including consecutive sentence context;
      generating subword embedding training data of {target word, contextual word} for subword embedding learning;
      generating skip-thought sentence embedding training data of {target sentence, contextual sentence} for skip-thought sentence embedding learning; and
      constructing a subword embedding and skip-thought sentence embedding integration model from the subword embedding training data and the skip-thought sentence embedding training data and generating the subword embedding vector values which are final training results, and
   wherein the performing the sentence embedding calculation comprises multiplying the subword embedding vector values and the position encoding values together to output products and calculating an average of the products regarding the whole input sentence.

2. The sentence embedding method of claim 1, wherein the subword embedding and skip-thought sentence embedding integration model finds a subword embedding value $\Phi_t$ which maximizes a log likelihood function L as shown in the following equation:

$$\mathcal{L} = \sum_{t=1}^{T_w} \sum_{c \in C_t} \log p(w_c \mid w_t) + \sum_{t=1}^{T_s} \sum_{n \in N_t} \log p(\text{sent}_n \mid \text{sent}_t)$$

(where $T_w$ denotes a size of subword embedding training data, $T_s$ denotes a size of skip-thought sentence embedding training data, $C_t$ denotes a set of contextual words $w_c$ of $w_t$, and $N_t$ denotes a contextual sentence set of a target sentence $\text{sent}_t$).

3. The sentence embedding method of claim 1, wherein the syntagma-based position encoding comprises applying differentiated weights to full morphemes and bound morphemes constituting the input sentence.

4. A subword embedding and skip-thought sentence embedding integration model construction method for generating the subword embedding vector values required for performing the sentence embedding method of claim 1, wherein the subword embedding and skip-thought sentence embedding integration model comprises:
   the subword table including a {word: subword set} dictionary and a {subword: vector value} table;
   the subword embedding training data of {target word, contextual word}; and
   the skip-thought sentence embedding training data of {target sentence, contextual sentence}.

5. The subword embedding and skip-thought sentence embedding integration model construction method of claim 4, wherein the subword embedding and skip-thought sentence embedding integration model finds a subword embedding value $\Phi_t$ which maximizes a log likelihood function L as shown in the following equation:

$$\mathcal{L} = \sum_{t=1}^{T_w} \sum_{c \in C_t} \log p(w_c \mid w_t) + \sum_{t=1}^{T_s} \sum_{n \in N_t} \log p(\text{sent}_n \mid \text{sent}_t)$$

(where $T_w$ denotes a size of subword embedding training data, $T_s$ denotes a size of skip-thought sentence embedding training data, $C_t$ denotes a set of contextual words $w_c$ of $w_t$, and $N_t$ denotes a contextual sentence set of a target sentence $\text{sent}_t$).

6. A sentence embedding apparatus for outputting a sentence embedding result from an input sentence on the basis of subword embedding and skip-thoughts, the apparatus comprising:
   a processor configured to:
   separate words of the input sentence for token separation and extract subwords from the separated words;
   derive subword embedding vector values by embedding the extracted subwords;
   perform syntagma-based position encoding using fixed weights according to word positions in the input sentence in order to determine position encoding values for sentence embedding calculation; and
   perform the sentence embedding calculation based on the subword embedding vector values and the position encoding values,
   wherein the deriving of the subword embedding vector values comprises:
      generating a subword table including a {word: subword set} dictionary and a {subword: vector value} table by separating the words and extracting the subwords from training text including consecutive sentence context;
      generating subword embedding training data of {target word, contextual word} for subword embedding learning;
      generating skip-thought sentence embedding training data of {target sentence, contextual sentence} for skip-thought sentence embedding learning; and
      constructing a subword embedding and skip-thought sentence embedding integration model from the subword embedding training data and the skip-thought sentence embedding training data and generating the subword embedding vector values which are final training results, and wherein the performing of the sentence embedding calculation comprises:
multiplying the subword embedding vector values and the position encoding values together to output products; and
calculating an average of the products regarding the whole input sentence.

7. The sentence embedding apparatus of claim 6, wherein the subword embedding and skip-thought sentence embedding integration model finds a subword embedding value $\Phi_t$ which maximizes a log likelihood function L as shown in the following equation:

$$\mathcal{L} = \sum_{t=1}^{T_w} \sum_{c \in C_t} \log p(w_c \mid w_t) + \sum_{t=1}^{T_s} \sum_{n \in N_t} \log p(\text{sent}_n \mid \text{sent}_t)$$

(where $T_w$ denotes a size of subword embedding training data, $T_s$ denotes a size of skip-thought sentence embedding training data, $C_t$ denotes a set of contextual words $w_c$ of $w_t$, and $N_t$ denotes a contextual sentence set of a target sentence $\text{sent}_t$).

8. The sentence embedding apparatus of claim 6, wherein the performing of the syntagma-based position encoding comprises applying differentiated weights to full morphemes and bound morphemes constituting the input sentence.

9. A subword embedding and skip-thought sentence embedding integration model for generating the subword embedding vector values required for performing a sentence embedding function of the sentence embedding apparatus of claim 6, the model comprising:
the subword table including a {word: subword set} dictionary and a {subword: vector value} table;
the subword embedding training data of {target word, contextual word}; and
the skip-thought sentence embedding training data of {target sentence, contextual sentence}.

10. The subword embedding and skip-thought sentence embedding integration model of claim 9, wherein the subword embedding and skip-thought sentence embedding integration model finds a subword embedding value $\Phi_t$ which maximizes a log likelihood function L as shown in the following equation:

$$\mathcal{L} = \sum_{t=1}^{T_w} \sum_{c \in C_t} \log p(w_c \mid w_t) + \sum_{t=1}^{T_s} \sum_{n \in N_t} \log p(\text{sent}_n \mid \text{sent}_t)$$

(where $T_w$, denotes a size of subword embedding training data, $T_s$ denotes a size of skip-thought sentence embedding training data, $C_t$ denotes a set of contextual words $w_c$ of $w_t$, and $N_t$ denotes a contextual sentence set of a target sentence $\text{sent}_t$).

* * * * *